July 5, 1966   W. D. SMILEY   3,258,817
METHOD OF PREPARING COMPOSITE HARD METAL MATERIAL WITH
METALLIC BINDER
Filed Nov. 15, 1962   3 Sheets-Sheet 1

William D. Smiley   INVENTOR.

BY James E. Reed
ATTORNEY

United States Patent Office 3,258,817
Patented July 5, 1966

3,258,817
METHOD OF PREPARING COMPOSITE HARD
METAL MATERIAL WITH METALLIC BINDER
William D. Smiley, Los Altos Hills, Calif., assignor, by
mesne assignments, to Esso Production Research Company, Houston, Tex., a corporation of Delaware
Filed Nov. 15, 1962, Ser. No. 238,054
18 Claims. (Cl. 22—202)

The present invention relates to materials useful for the fabrication of articles which are normally subjected to severe abrasion and erosion and is particularly concerned with an improved composite material containing refractory hard metal particles and a metallic binder.

Composite materials containing refractory hard metal granules supported within metallic binders have been used in the fabrication of machine tools, wire dies, drill bits, exhaust nozzles, diamond saws, bearing members and similar articles in the past. Such materials may be produced, for example, by placing powdered tungsten carbide or a powdered tungsten carbide alloy containing titanium carbide, tantalum carbide or other constituents in a refractory mold of the desired shape, adding pellets of a suitable binder metal, and thereafter heating the mold and its contents to a preselected infiltration temperature between the melting point of the binder and the carbide degradation temperature. As the binder metal approaches this infiltration temperature, it melts and flows into the interstices between the carbide granules. The composite material obtained upon cooling the mold and its contents consists of a continuous binder phase within which the carbide granules are dispersed. Because this process does not require high pressures and results in essentially no shrinkage of the material within the mold, it has pronounced advantages over other methods used to produce composite materials, particularly in cases where articles having thin sections or intricate shapes must be produced or where the composite material must be bonded to a supporting member of steel or other metal.

Despite the advantages of the process described above, composite materials produced by this process have certain limitations. Studies have shown that such materials often have low compressive strengths, that they frequently lack the hardness required for certain applications, and that their resistance to erosion is often poor when compared with that of the hard metal itself. The importance of these limitations depends upon the application for which the material is intended. In machine tool cutting elements, for example, extreme hardness is essential. Where the materials are used as bearing members, high compressive strength may be critical. In oilfield drill bits and in nozzles, excellent erosion resistance is generally required. Efforts to improve such materials by developing better binder metals and improved infiltration techniques have been only partially successful. There are still many uses for which composite materials produced by infiltrating refractory hard metal particles with metallic binders in the conventional manner are not entirely satisfactory.

It is therefore an object of the present invention to provide a process for the production of improved composite materials by the infiltration of refractory hard metal particles with metallic binders. A further object is to provide an infiltration process using powdered refractory hard metals and metallic binders which will permit the production of composite materials character-ized by higher strength, greater hardness and better erosion resistance than materials produced by infiltration in the past. Still another object is to provide an improved infiltration process for bonding powdered refractory hard metal granules within metallic binders which permits the production of composite materials particularly suited for use in nozzles, drill bits and similar articles normally subjected to high stresses and severe abrasion and erosion. Still other objects will become apparent as the invention is described in greater detail hereafter.

In accordance with the invention, it has now been found that composite materials characterized by high compressive strength, extreme hardness and excellent erosion resistance can be prepared by infiltrating spheroidal refractory hard metal powders with binder metals which melt at temperatures in the range between about 1500° F. and about 3000° F. and in the molten state have the ability to wet the powder granules. Metallurgical studies and infiltration tests have shown that the infiltration of spheroidal hard metal powder with suitable binders permits the production of composite materials which have surprisingly better properties than those available in the past and that particularly effective results can be obtained by infiltrating the spheroidal powder granules under conditions such that fine hard metal crystals are precipitated in the binder adjacent the granules as the binder and granules are cooled. These crystals grow as cooling continues and result in the formation of a material containing an essentially continuous hard metal structure containing intergranular spaces filled with the binder metal. This material resists abrasion and erosion much better than earlier materials containing hard metal particles and metallic binders and is therefore much more suitable for use in nozzles, drill bits and other articles which are normally subjected to severe abrasion and erosion.

The nature and objects of the invention can best be understood by referring to the following detailed description of the materials utilized and the method employed to produce the improved composite materials and to the accompanying drawing, in which.

Figure 5:
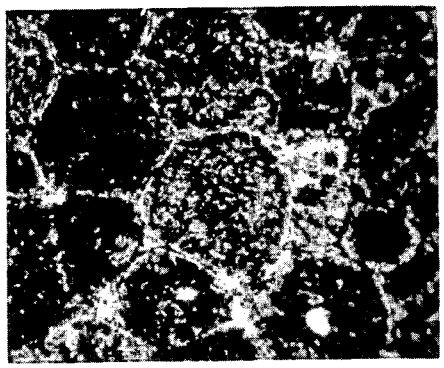
Figure 6:
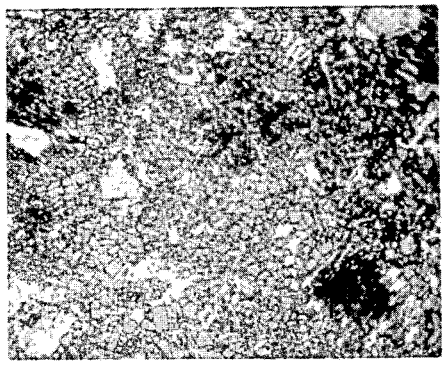

FIGURE 5 is a reproduction of a photomicrograph illustrating the structure of a composite material produced by infiltrating spheroidal tungsten carbide particles with a binder containing carbide-forming elements; and, FIGURE 6 is a reproducttion of still another photomicrograph showing the structure obtained when spheroidal tungsten carbide particles are infiltrated with a high solubility binder at higher temperatures.

The spheroidal powders employed in producing the improved composite materials of the invention are prepared from the refractory hard metals. The term "refractory hard metals" is used in the art to designate compounds between a transition metal of the fourth to sixth groups of the Periodic Table and a comparatively small nonmetal atom which are characterized by high hardness, high melting points and metallic bonding. It is generally considered to include the carbides, borides, nitrides and silicides of titanium, zirconium, hafnium, vanadium, niobium, tantalum, chromium, molybdenum and tungsten. Of these refractory hard metals, the refractory hard metal carbides and borides are preferred for purposes of the invention. The hard metal carbides are more readily available from commercial sources and will therefore generally be employed. Such carbides include tungsten carbide, titanium carbide, tantalum carbide, niobium carbide, vanadium carbide, hafnium carbide, chromium carbide, molybdenum carbide, zirconium carbide and mixtures thereof. Small amounts of cobalt, iron, nickel or other metals may in some cases be present in these carbides, particularly where spheroidal carbide powder produced from sintered carbide or carbide scrap is used. All such carbides are not equally effective for purposes of the invention. Tungsten carbide and alloys containing tungsten carbide and lesser amounts of titanium carbide, tantalum carbide, or tantalum and niobium carbide are particularly preferred because of their hardness, strength characteristics, and wettability.

Spheroidal refractory hard metal powders may be prepared from the hard metals referred to above by means of an electric arc through which a gas stream is passed. The hard metals are melted with the arc by utilizing a hard metal rod as one of the arc electrodes, by feeding such a rod into the high temperature plasma generated by the arc, or by entraining angular hard metal powder in the gas stream fed to the arc. The molten droplets produced by the arc assume a spheroidal shape as the result of surface tension forces in the high temperature liquid. The size of these droplets can be controlled by regulating the gas stream velocity, the arc conditions, and the size of the feed material. The gas stream cools rapidly after it leaves the arc and hence the entrained droplets quickly solidify to form spheroidal granules. These granules can then be collected and screened to the proper size range. Apparatus which may be employed for the production of spheroidal powder granules from refractory hard metals in this manner has been disclosed in U.S. Patent 3,041,672 and elsewhere in the patent literature and therefore need not be described in detail for purposes of this invention.

The binder metals employed with the spheroidal powder to produce the composite materials of the invention are metals and metal alloys which melt at temperatures within the range between about 1500° F. and about 3000° F. and in the molten state have the ability to wet the powder granules. A variety of metallic compositions suitable for purposes of the invention have been employed in the past for brazing or otherwise bonding refractory hard metal particles to steel and the like and will therefore be familiar to those skilled in the art.

The preferred binders for purposes of the invention are those which contain about 50% or more by weight of one or more metals from Group VIII, Series 4 of the Periodic Table, and melt at temperatures in the range between about 2000° F. and about 2800° F. The spheroidal hard metal powders are relatively soluble in molten binders which contain substantial quantities of iron, nickel or cobalt and hence such binders can be employed for the production of composite materials having continuous hard metal structures. The preferred binders may contain, in addition to iron, nickel, cobalt or a mixture of these metals, lesser amounts of copper, tin, manganese, chromium, aluminum, molybdenum, beryllium, bismuth, boron, cadmium, carbon, silicon, silver, titanium, tungsten, zirconium, niobium, tantalum and other materials in sufficient quantities to reduce the melting point, increase the binder hardness, or improve the wettability and solubility of the powdered hard metal in the binder. The amounts in which these latter constituents are present will depend in part upon the particular spheroidal powder utilized and in part upon the infiltration conditions employed. Experience has shown that the wettability characteristics of the various powdered hard metals differ and that variations in binder composition or changes in infiltration conditions may be necessary in order to secure the desired results with a particular carbide. Mixed carbides consisting largely of titanium carbide, for example, are not readily wet by certain of the binder metals suitable for use with most other hard metal carbides but can be used with proper conditions by pretreating them with hydrogen to remove oxides from their surfaces and by infiltrating under a hydrogen atmosphere or vacuum.

A particularly effective group of binders for purposes of the invention are those prepared by saturating an alloy containing about 50% or more of iron, nickel, cobalt or a mixture of these metals with a hard metal carbide at elevated temperature prior to infiltration. By heating such an alloy to a temperature above the infiltration temperature, adding hard metal carbide chips or powder and letting it dissolve, and then infiltrating at the desired temperature, materials which are extremely hard, have high strength, and are exceptionally resistant to erosion and abrasion can be prepared. The saturated binders thus employed may be allowed to cool to the infiltration temperature without solidifying or may instead be solidified and remelted prior to infiltration.

Typical binder compositions which may be employed for purposes of the invention include (a) copper; (b) silver; (c) copper—53%, nickel—37%, zinc—10%; (d) copper—55%, nickel—18%, zinc—27%; (e) copper—60%, nickel—29%, tin—11%; (f) copper—40%, zinc—60%; (g) copper—63%, nickel—5%, tin—32%; (h) copper—62%, nickel—10%, tin—28%; (i) copper—58%, nickel—15%, tin—27%; (j) nickel—55%, copper—35%, tin—10%; (k) nickel—55%, copper—35%, manganese—5%, silicon—3%, iron—2%; (l) nickel—55%, copper—32%, manganese—5%, silicon—3%, molybdenum—3%; (m) nickel—40%, copper—32%, manganese—5%, silicon—3%, iron—2%, molybdenum—3%, cobalt—15%; (n) iron—90%, nickel—10%; (o) iron—97%, carbon—3%; (p) nickel—63%, copper—30%, iron—2%, manganese—0.9%, silicon—4%, carbon—0.1%; (q) nickel—67%, copper—30%, iron—1.4%, manganese—1%; (r) nickel—47.8%, copper—29.4%, tin—8.4%, iron—14.4%; (s) nickel—49.4%, copper—31.4%, tin—9%, niobium carbide—10%; (t) nickel—49.4%, copper—31.4%, tin—9%, tantalum carbide—10%; (u) nickel—40%, copper—32%, cobalt—15%, manganese—5%, silicon—3%, molybdenum—3%, iron—2%; (v) nickel—47.0%, copper—30.4%, tin—9.2%, manganese—2.0%, silicon—2.0%, iron—9.4%; (w) nickel—42.9%, copper—27.8%, tin—8.4%, silicon—1.8%, manganese—1.9%, iron—17.2%; (x) nickel—80.0%, boron—1.0%, carbon—0.1%, chromium—4.0%, silicon—4.0%, iron—0.5%, molybdenum—4.7%, tin—5.7%; (y) copper—25.0%, nickel—40.0%, boron—2.0%, carbon—0.5%, chromium—20.0%, silicon—1.5%, iron—5.0%, molybdenum—6.0%; (z) nickel—60%, copper—15.0%, boron—4.0%, carbon—0.1%, chromium—10.0%, silicon—3.0%, iron—0.5%, molybdenum—0.8%, tin—6.6%; (aa) boron—1.3%, nickel—47.0%, chromium—16.9%, copper—21.6%, carbon—0.8%, silicon—2.1%, iron—4.8%, tin—5.5%; (bb) nickel—71.0%, chromium—19.8%, silicon—3.5%, boron—3.2%, iron—1.5%, carbon—1.0%; (cc) nickel—49.4%, copper—31.4%, tin—9.0%, tungsten carbide—10%; (dd) nickel—46.4%, copper—30.2%, tin—8.7%, tungsten carbide—14.1%, cobalt—0.6%; (ee) iron—1.25%, nickel—68.67%, chromium—5.0%, carbon—0.08%, silicon—1.25%, boron—1.25%, copper—17.5%, tin—5.0%; (ff) nickel—40%, cobalt—15%, copper—32%, manganese—5%, molybdenum—3%, silicon—3%, iron—2%; (gg) nickel—82.35%, chromium—10%, iron—2.5%, silicon—2.5%, boron—2.5%, carbon—0.15%; (hh) cobalt—40%, nickel—27%, chromium—19%, iron—1%, silicon—4%, boron—3%, molybdenum—6%; and (ii) iron—14.8%, nickel—46.2%, carbon—0.7%, silicon—0.48%, copper—29.9%, tin—8.4%.

It will be understood that the compositions set forth above are exemplary of those which may be employed for purposes of the invention but that other metals and metal alloys which melt at temperatures in the range between about 1500° F. and about 2800° F. and in the molten state have the ability to wet the spheroidal hard metal powder may also be used. The optimum infiltration conditions and binder compositions for a particular spheroidal powder can readily be determined by infiltrating test specimens of the powder with various binders at selected temperatures and noting the extent to which complete infiltration occurs.

In utilizing the spheroidal powder for infiltration purposes, the powder is preferably first cleaned with dilute nitric acid and alcohol or similar solvents to remove dust, oil and other foreign matter. The clean powder is then placed in a clean carbon or ceramic mold of the desired shape. The use of a carbon mold is generally preferred, since this insures a reducing atmosphere during infiltration. The mold may be vibrated as the spheroidal powder is added in order to obtain a densely-packed mass or, if desired, may be pressed at a pressure of about 100 to about 200 pounds per square inch in order to assure close packing of the powder granules. This latter step is generally unnecessary, however, because the spheroidal granules readily flow into very small cavities and form a much denser mass than can generally be obtained with angular carbide particles of the same size. Up to about 35 weight percent of powdered nickel may be placed in the mold with the spheroidal powder to aid in wetting the spheroidal granules by the infiltrant metal if desired. The use of powdered nickel is not essential and is normally avoided, however, because it necessitates a reduction in the amount of spheroidal hard metal powder utilized.

The spheroidal powder placed in the mold prior to infiltration will generally range in size between about 400 mesh and about 20 mesh on the Tyler screen scale. In certain instances where a composite material which is particularly resistant to severe erosion and abrasion is required, it may be advantageous to utilize powder granules of two or more sizes which differ in average diameter by a factor of from about 5 to about 10. This results in closer packing of the spheroidal granules, produces a composite material having a considerably higher refractory hard metal content, and leads to a higher density material than can generally be obtained otherwise. The use, for example, of a mixture of relatively large spheroidal granules having an average size between about 42 mesh and about 48 mesh and relatively small granules having an average size between about 270 mesh and about 325 mesh reduces the space occupied by the binder metal following infiltration and thus results in a superior product. If powder of two different sizes is used in this manner, it should be vibrationally mixed to secure even dispersal of the large and small particles but care should be taken to avoid grading of the particles by excessive agitation. A particle size ratio of about 7:1 is preferred.

After the mold has been filled with the required amount of the spheroidal powder as described earlier, a mold cover containing an opening through which the binder metal may flow is generally fitted into place. Some molds are provided with an upper recess in the cover to hold pellets of the binder metal. As the pellets melt, the metal flows into the mold and infiltration occurs. In other instances, the pellets of binder metal may be placed on top of the spheroidal powder without using a mold cover. In still other cases, the binder metal is heated in a separate crucible or other vessel and then poured into the mold at the proper time. This latter procedure generally permits much better control of the infiltration conditions and may therefore by preferred.

It is generally preferred to preheat the assembled mold at a temperature between about 300° F. and about 600° F. for an hour or longer in order to eliminate gases from the mold which might otherwise tend to cause oxidation at the infiltration temperature. Following this preheating step, the mold and crucible containing the binder metal are heated to a temperature between about 1750° F. and about 3000° F. The temperature employed should not greatly exceed that required for rapid infiltration of the binder into the interstices between the spheroidal granules. The composition of the binder primarily determines the infiltration temperature necessary. Copper-nickel alloys and similar binders generally infiltrate readily at temperatures between about 2000° F. and about 2250° F. Somewhat higher temperatures are required for the infiltration of iron-nickel-carbon alloys and the like. Still other binders, silver for example, may be utilized at temperatures below those required for the copper-nickel alloys. As pointed out earlier, the use of powdered nickel in the mold normally promotes wetting of the hard metal granules and may therefore permit the use of a somewhat lower infiltration temperature than might otherwise be required; whereas temperatures somewhat higher than those specified above may be necessary with particular spheroidal powder-binder metal combinations. The precise temperature required for optimum infiltration of a particular binder metal into a given spheroidal powder can readily be determined by preparing test specimens as described earlier.

After the furnace has returned to the desired infiltration temperature following the insertion of the mold and crucible, heating is continued for a period of from a few minutes to an hour or more in order to melt the binder metal and bring the contents of the mold up to the infiltration temperature. The time required to reach this temperature will depend in part upon the type of furnace utilized and upon the size and heat transfer characteristics of the mold. The spheroidal hard metal powder can be held at elevated temperatures for long periods prior to infiltration without adverse effects and hence heating for longer than is necessary does not seriously affect the properties of the finished composite material. After sufficient time for the mold contents to have reached the infiltration temperature has elapsed, the binder metal is poured from the crucible or other vessel in which it was melted into the mold. The mold is then held at the infiltration temperature for a period which may range from about 1 minute up to about 20 minutes or more. Periods less than about 6 minutes are usually preferable. The molten binder metal poured into the mold flows into the interstices between the spheroidal hard metal granules. Where a binder containing in excess of about 50% by weight of iron, nickel, cobalt or a combination of these metals is used, the molten binder metal dissolves a portion of the hard metal on the outer surfaces of the spheroidal granules. If a binder containing relatively small amounts of iron, nickel or cobalt is employed, little or no hard metal is normally dissolved. The mold is then removed from the furnace and allowed to cool. As the temperature of the mold and its contents drops, any dissolved hard metal present in the binder metal is precipitated from solution between the hard metal granules. Under the proper conditions, this may result in an intergrowth of the granules to form a continuous hard metal phase. The binder metal solidifies within the intergranular spaces and thus contributes strength and ductility to the finished material. The resultant composite material has considerably greater compressive strength and is more resistant to abrasion and erosion than composite materials available heretofore.

It is generally preferred that the mold and its contents be cooled quickly following infiltration to a temperature below the melting point of the binder metal employed. The method used to cool the mold will depend primarily upon the mold size. In the case of relatively large molds, a water spray should ordinarily be employed to assure cooling at a sufficiently rapid rate. With smaller molds an air blast will usually suffice. After the mold and its contents have reached room temperature, the finished composite article may be removed and sand blasted or machined to remove surface irregularities.

Diamonds or particles of hard metal carbide, boride or similar material may be bonded within a composite matrix produced as described above by embedding them in the spheroidal hard metal powder prior to the infiltration step. An effective bond between the diamond or hard metal chips or particles and the binder alloy is formed as the molten alloy cools and solidifies in the mold. The particles utilized in this manner may be angular chips or fragments produced by fracturing larger pieces of tungsten carbide, titanium boride or a similar material having a Rockwell A hardness in excess of about 85 or may instead be cubes or other regularly shaped particles produced by sintering suitable powder in the presence of cobalt or a similar cementing metal. This provides a convenient and highly effective method for mounting diamonds and hard metal inserts to be used as cutting elements on drill bits and similar tools. The hard metal particles employed for this purpose will generally range between about $\frac{1}{32}$ inch and about $\frac{1}{2}$ inch in size. Diamonds employed in this manner will normally be somewhat smaller because of their higher cost.

The composite materials of the invention may be bonded to steel or similar ferro-alloy surfaces during the infiltration process. By positioning a steel tool blank or similar ferro-alloy article in a suitable mold, placing the spheroidal hard metal granules in voids adjacent the surfaces of the blank, and then infiltrating with a molten binder alloy as described, a bond between the binder metal and steel and between the binder metal and spheroidal granules can be formed. This simplifies the fabrication of articles which require a hard outer surface resistant to abrasion and erosion but need not be made entirely of hard metal carbide or similar material. Care should be taken during the manufacture of such articles to avoid damage to the steel during the cooling step following infiltration. It is generally preferred to cool the mold rapidly to a temperature below the melting point of the binder metal, about 1450° F. for example, and then to cool slowly to room temperature. This generally avoids pronounced changes in the property of the steel due to the heating and subsequent cooling steps.

The process of the invention and the properties of composite materials produced by that process can be further illustrated by considering the following examples.

EXAMPLE I

In the first of a series of tests, specimens of composite materials composed of tungsten carbide powder and a metallic binder containing about 55 percent nickel, about 35 percent copper and about 10 percent tin were prepared. The first set of specimens was made with angular tungsten carbide powder between 175 and 325 mesh in size. This powder was packed into a carbon mold containing cylindrical cavities ½ inch in diameter and 1 inch long. The mold was heated in an electric furnace to an infiltration temperature of 2200° F. Molten binder metal separately heated to the same temperature in a crucible placed in the furnace was then poured into the mold. The mold and its contents were held at the 2200° F. temperature for a period of four minutes in order to permit complete infiltration. At the end of this four minute period, the mold was removed from the furnace and air cooled to room temperature. The resulting specimens were then cut in two, etched and polished to bring out the carbide structure.

Figure 1:
FIGURE 1 is a reproduction of a photomicrograph showing the structure of a composite material prepared with angular tungsten carbide powder and a metallic binder.

FIGURE 1 of the drawing is a reproduction of a photomicrograph showing a composite material specimen prepared with the angular tungsten carbide powder and binder metal as described in the preceding paragraph. The photomicrograph was taken at 500 power magnification. The dark, irregularly shaped areas of the photomicrograph represent angular tungsten carbide granules; while the lighter areas surrounding the granules indicate the binder metal. Some small crystals of tungsten carbide which have precipitated in the binder metal as it cooled are visible near the powder granules. It is apparent from the photomicrograph that the packing of the angular granules is very irregular and that there are large areas where no tungsten carbide is present. Some shifting of the powder evidently occurred during infiltration. Because of the irregular distribution of the angular carbide granules and the high binder content, the physical properties of this composite material are determined to a large extent by the properties of the binder metal.

After the specimens prepared as described above had been examined, a second set of specimens was prepared using 175–325 mesh spheroidal tungsten carbide powder and the binder containing about 55 percent nickel, about 35 percent copper and about 10 percent tin. The spheroidal powder was produced by passing angular cast tungsten carbide powder similar to that employed to produce the earlier specimens through a high temperature arc in a gas stream, rapidly cooling the gas to solidify the molten carbide droplets, and thereafter screening the resultant material to recover spheroidal granules in the 175–325 mesh range. The spheroidal granules were poured into a carbon mold of the type employed previously and again the mold and a crucible containing the binder metal were heated to an infiltration temperature of 2200° F. The molten binder was poured into the mold and the mold and its contents were then held at the infiltration temperature for four minutes. At the end of this period, the mold was removed from the furnace and air cooled to room temperature. The specimens thus prepared were then cut, etched and polished as described earlier.

Figure 2:
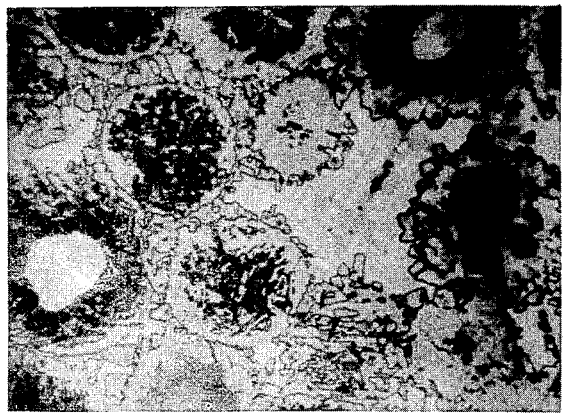
FIGURE 2 is a reproduction of a similar photomicrograph of a composite material produced with spheroidal tungsten carbide powder and the same metallic binder to produce a continuous carbide structure.

FIGURE 2 of the drawing is a photomicrograph of a specimen produced with the spheroidal tungsten carbide powder and copper-nickel-tin binder as set forth above. The photomicrograph was taken at 500 power magnification. It will be noted that the spheroidal tungsten carbide granules appear as generally circular areas on the photomicrograph and that each granule is linked to those adjoining it by crystals of tungsten carbide. These crystals were evidently formed by the precipitation of tungsten carbide which was initially dissolved in the high nickel binder and then crystallized as the binder cooled following infiltration. The open area at the right center of the photomicrograph is due to the existence of a spheroidal carbide granule just below the surface on which the specimen was cut and is not an indication of a shifting of the granules during infiltration. This material, because of the continuous carbide structure produced by the precipitation of dissolved tungsten carbide in the binder, is much harder and more resistant to abrasion and erosion than the material of FIGURE 1.

EXAMPLE II

Following the preparation of specimens using spheroidal tungsten carbide powder and a copper-nickel-tin binder as described in the previous example, specimens of a composite material containing similar powder and a lower melting point binder were prepared. The metallic binder utilized contained 53 percent copper, 37 percent nickel and 10 percent zinc. The spheroidal powder was packed into a carbon mold of the type described earlier and pellets of the binder metal were placed in a recess in the upper part of the mold. The mold was then inserted in a furnace and heated to an infiltration temperature of 2000° F. As it approached this infiltration temperature, the binder metal melted and subsequently flowed into the interstices between the carbide granules. The mold was held at the 2000° F. temperature for four minutes and then cooled. The specimens obtained from the mold were cut, polished and etched to show the structure of the composite material.

Figure 3:
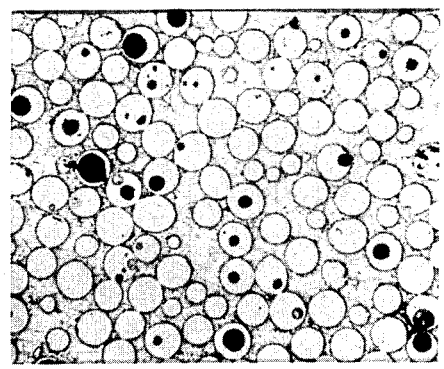
FIGURE 3 is a reproduction of another photomicrograph showing the structure of a composite material produced with spheroidal tungsten carbide and a different metallic binder.

FIGURE 3 of the drawing is a reproduction of a photomicrograph, taken at 100 power magnification, showing the structure of the material produced as described in the paragraph above. The spheroidal tungsten carbide granules are clearly visible in the photomicrograph. The granules are closely spaced so that only a small area is occupied by binder metal. This results in a much higher bulk density and a material which has greater overall hardness than those produced with angular carbide powder and similar binders. It will be noted, however, that the extensive precipitation of tungsten carbide crystals shown in the earlier photomicrograph is not evident and that a continuous carbide structure was not obtained. Substantial quantities of tungsten carbide were not dissolved in the low nickel binder under the infiltration conditions employed. Materials produced with spheroidal carbide powder and the lower melting point binders are therefore somewhat softer and more susceptible to erosion than those prepared with spheroidal powder and binders containing substantial amounts of iron, nickel or cobalt. Such materials are nevertheless markedly superior to materials prepared by infiltrating angular tungsten carbide powder in the conventional manner.

EXAMPLE III

A series of tests to determine the hardness of the composite materials of the invention was carried out following the metallurgical examinations described above. Specimens of (1) a material produced by infiltrating angular tungsten carbide powder obtained from a commercial source with a metallic binder containing 53 percent copper, 37 percent nickel and 10 percent zinc; (2) a material produced by infiltrating the same angular tungsten carbide powder with a binder containing about 55 percent nickel, about 35 percent copper and about 10 percent tin; (3) a material produced by infiltrating spheroidal tungsten carbide powder with the same copper-nickel-zinc binder; and (4) a material produced by infiltrating the spheroidal carbide powder with the same copper-nickel-tin binder were tested. The powder ranged between about 175 and about 325 mesh on the Tyler screen scale in each case. Infiltration was carried out at a temperature of 2150° F. with the copper-nickel-zinc binder. The copper-nickel-tin binder was employed at infiltration temperatures of about 2200° F. Aside from the temperature used, the infiltration procedures were essentially the same in all cases. All samples were held at the infiltration temperature for five minutes following infiltration. The hardness tests were conducted with a Rockwell testing machine using a standard diamond point and hence the hardness values obtained are expressed on the Rockwell C scale. Two specimens of each material were used and at least five tests of each specimen were made in order to secure reliable values. The values reported are averages. The results of hardness tests are shown in Table I below.

*Table I*

HARDNESS OF COMPOSITE MATERIALS

| Binder Metal | Hard Metal Carbide Powder | Hardness, Rockwell C [3] |
| --- | --- | --- |
| Alloy A [1] | Angular tungsten carbide 175–325 mesh. | 26 |
| Alloy A [1] | Spheroidal tungsten carbide 175–325 mesh. | 41 |
| Alloy B [2] | Angular tungsten carbide 175–325 mesh. | 42 |
| Alloy B [2] | Spheroidal tungsten carbide 175–325 mesh. | 57 |

[1] Alloy A contained 53% copper, 37% nickel and 10% zinc on a weight basis.
[2] Alloy B contained about 55% nickel by weight, about 35% copper weight, and about 10% tin by weight.
[3] Each value represents at least five tests of each of at least two different samples.

It can be seen from Table I that, with a given binder, the composite material specimens produced from the spheroidal tungsten carbide powder had significantly higher Rockwell C hardness values than those produced with angular powder. This demonstrates the superiority of composite materials produced with spheroidal hard metal powders over materials prepared by infiltrating angular powders. The use of spheroidal powder with a binder containing in excess of 50% nickel to produce a continuous carbide structure resulted in a material which was appreciably harder than any of the other composite materials and hence binders of this type are preferred for applications requiring extreme hardness and high abrasion resistance.

EXAMPLE IV

Erosion tests of materials prepared with angular and spheroidal tungsten carbide powder were carried out to demonstrate the effectiveness of the materials of the invention for use in nozzles, valve seats and other applications where severe erosion normally presents problems. The materials tested included (1) a composite material produced by infiltrating angular tungsten carbide powder between 175 and 325 mesh in size with a metallic binder containing about 35 percent copper, about 55 percent nickel and about 10 percent tin; (2) a composite material produced with spheroidal tungsten carbide powder and the same binder alloy; and (3) a specimen of commercial sintered tungsten carbide containing 10 percent cobalt. Each specimen measured one-half inch in diameter by one inch long. The erosion tests were carried out by weighing each specimen, jetting water containing entrained aluminum oxide particles against the side of each specimen at essentially constant velocity for a period of 2 hours, and then re-weighing the specimens to determine the weight loss due to erosion. The results of these tests are set forth in Table II below.

*Table II*

EROSION RESISTANCE OF COMPOSITE MATERIALS

Material:                Weight loss due to erosion, percent
Angular tungsten carbide powder infiltrated with
  an alloy containing about 55% nickel, 35%
  copper and 10% tin _____ 2.82
Spheroidal tungsten carbide powder infiltrated
  with an alloy containing about 55% nickel,
  35% copper and 10% tin _____ 1.59
Sintered tungsten carbide containing 10% cobalt _ 1.55

Table II shows that the erosion resistance of the composite material containing spheroidal tungsten carbide powder and the copper-nickel-tin binder was substantially higher than that of the material prepared with angular powder and the same binder and approached the value obtained for sintered tungsten carbide. This extremely higher erosion resistance makes the composite materials of the invention particularly attractive for use in nozzles and similar devices where erosion conditions are severe.

EXAMPLE V

A further series of tests was carried out to measure the compressive strengths of composite materials produced by infiltrating angular and spheroidal tungsten carbide powder with metallic binders. The specimens utilized were prepared with powder screened to between 250 and 270 mesh and a binder containing 53% copper, 37% nickel and 10% zinc. Metallographic examination of these specimens showed that, because of the comparatively low solubility of the carbide powder in this binder, little precipitation of carbide crystals occurred and hence the tungsten carbide was present as a discontinuous, rather than continuous, phase. The strength tests were carried out on a conventional testing machine. The results are shown in Table III.

*Table III*

PHYSICAL PROPERTIES OF COMPOSITE MATERIALS

| Composition | Compressive Strength, p.s.i. | Total Strain, Percent | Density, gms./cc. |
|---|---|---|---|
| Angular tungsten carbide powder infiltrated with an alloy containing 53% copper, 37% nickel and 10% zinc | 72,500 | 2.7 | 10.6 |
| Angular tungsten carbide powder infiltrated with an alloy containing 53% copper, 37% nickel and 10% zinc | 71,000 | 3.4 | |
| Angular tungsten carbide powder infiltrated with an alloy containing 53% copper, 37% nickel and 10% zinc | 75,000 | 2.8 | |
| Spheroidal tungsten carbide powder infiltrated with an alloy containing 53% copper, 37% nickel and 10% zinc | 114,000 | 3.1 | 12.35 |
| Spheroidal tungsten carbide powder infiltrated with an alloy containing 53% copper, 37% nickel and 10% zinc | 104,000 | 2.4 | |

It can be seen from the above table that the specimens prepared with spheroidal tungsten carbide powder had about 50% greater compressive strength than did those prepared with the angular powder. This improvement in compressive strength was not obtained by sacrificing ductility. The specimens all showed approximately the same total strain at failure. The data thus demonstrate that materials containing the spheroidal powder granules may be extremely useful in tools and other articles where compressive stresses are generally high.

EXAMPLE VI

In order to demonstrate the effect of other binders in preparing the improved composite materials of the invention, a series of additional specimens were prepared by infiltrating spheroidal tungsten carbide with various alloys having the ability to wet spheroidal tungsten carbide powder. The specimens thus produced were then examined metallographically to determine the characteristics of the materials. The results obtained are summarized in Table IV below.

*Table IV*

INFILTRATION OF SPHEROIDAL CARBIDE POWDER WITH METALLIC BINDERS

| Specimen | Binder Composition | Powder Composition | Infiltration History | | Remarks |
|---|---|---|---|---|---|
| | | | Time, Min. | Temp., °F. | |
| A | Cast iron | 175-325 spheroidal WC | 4 | 2,400 | Continuous carbide structure. |
| B | Iron, 90%; nickel, 10% | do | 4 | 2,400 | Do. |
| C | "S Monel" | do | 4 | 2,400 | Good bonding, continuous carbide structure. |
| D | Nickel, 40%; copper, 32%; cobalt, 15%; manganese, 5%; silicon, 3%; molybdenum, 3%; iron, 2%. | do | 4 | 2,400 | Well bonded continuous structure. |
| E | Nickel, 52.8%; copper 33.6%; tin, 9.6%; iron, 4% | do | 4 | 2,250 | Continuous carbide structure. |
| F | Nickel, 50.6%; copper 32.2%; tin, 9.2%; iron, 8% | do | 4 | 2,250 | Do. |
| G | Nickel, 46.2%; copper, 29.4%; tin, 8.4%; iron, 16%. | do | 4 | 2,250 | Do. |
| H | Nickel, 58.85%; copper, 26.25%; tin, 7.5%; chromium, 4.25%; iron, 1%; silicon, 1%; boron, 0.87%; carbon, 0.25%. | do | 4 | 2,275 | Hard, continuous carbide structure. |
| I | Nickel, 65%; copper, 16.5%; chromium, 8%; silicon, 4%; iron, 2%; boron, 2%; molybdenum, 1.5%; carbon, 0.25%. | do | 10 | 2,300 | Continuous carbide structure. |
| J | Iron, 14.8%; nickel, 46.2%; copper, 29.9%; tin, 8.4%; carbon, 0.7%; silicon, 0.48%. | do | 10 | 2,275 | Do. |

The data set forth in Table IV show that composite materials having properties similar to those of the materials prepared in the previous examples can be produced with a variety of other binder metals. Tests of the erosion characteristics and other properties of such materials have demonstrated that they are markedly superior to conventional composite materials produced with angular powder.

EXAMPLE VII

In order to demonstrate the effect of presaturating the binder metal with a refractory hard metal prior to infiltration, a series of additional specimens using spheroidal tungsten carbide powder and a binder containing about 55% nickel, about 35% copper, and about 10% tin were prepared. Prior to infiltration, samples of the binder were heated to temperatures between about 2450° F. and about 2800° F. Tungsten carbide powder, chips of tungsten carbide containing 10% cobalt, and niobium carbide were added to individual binder samples and the samples were held at these temperatures for periods of from 15 minutes to an hour in order to permit the added material to dissolve. Thereafter, the binder samples were cooled to infiltration temperatures between about 2200° F. and about 2400° F. or, in some cases, solidified and then reheated to the infiltration temperatures. The binder samples thus prepared were then poured into molds containing the spheroidal powder and allowed to infiltrate. After they had cooled to room temperature, the composite material samples were cut, polished and etched.

Figure 4:
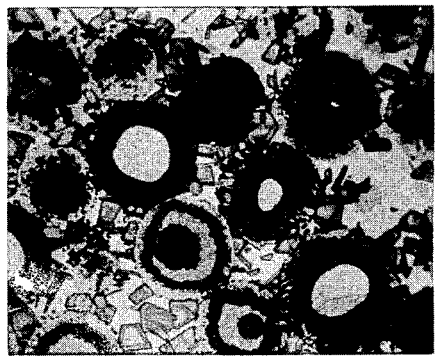
FIGURE 4 is a reproduction of a photomicrograph showing the structure obtained by the infiltration of spheroidal tungsten carbide powder with a binder presaturated with tungsten carbide.

Metallographic examination of the specimens prepared as described above showed in every case a continuous hard metal structure formed by the spheroidal powder granules and crystals of precipitated hard metal. FIGURE 4 of the drawing is a reproduction of a photomicrograph, made at 400 power magnification, of a typical specimen. This particular specimen was prepared with a binder presaturated with angular tungsten carbide powder at 2800° F. for a period of 60 minutes. The presaturated binder was poured into the spheroidal powder at 2200° F. and held at the infiltration temperature for 8 minutes. It will be noted that the precipitated hard metal crystals are much more in evidence in this specimen than in earlier specimens prepared without presaturating the binder. This results in a higher hard metal-to-binder ratio than is generally obtained and gives a product which is harder and more resistant to abrasion than those prepared with binders containing no pre-dissolved hard metal. Photomicrographs of specimens prepared by presaturating the binder with niobium carbide and other hard metals have shown similar results.

EXAMPLE VIII

An especially effective method for producing the improved composite materials of the invention involves the use of binders containing transition metals of the fourth through sixth groups of the periodic table. These metals, when present in the binder, react with hard metal dissolved by the binder to form binary or ternary hard metal compositions which crystallize about the spheroidal powder granules. Chromium carbide and tungsten carbide, for example, form a binary carbide which is somewhat harder but more brittle than tungsten carbide alone. The addition of molybdenum to such a system reduces the brittleness and probably results in a ternary system containing tungsten carbide, chromium carbide and molybdenum carbide. Studies have shown that a wide variety of binary, ternary and quaternary systems can be formed in this manner.

FIGURE 5 of the drawing is a reproduction of a photomicrograph, made at 400 power magnification, of a specimen prepared by infiltrating spheroidal tungsten carbide powder with a metallic binder containing 65 wt. perecnt nickel, 16.5 wt. percent copper, 8 wt. percent chromium, 4 wt. percent silicon, 2 wt. percent iron, 2 wt. percent boron, 1.5 wt. percent molybdenum, and 0.25 wt. percent carbon. It will be noted that the structure of this material differs considerably from the materials shown in earlier figures in that the individual powder granules no longer appear spheroidal and that the structure is instead made up of very closely spaced particles of hexagonal cross-section. The areas occupied by free binder metal have been reduced to a minimum. The chromium, boron, and molybdenum present in the binder metal apparently led to the formation of a complex carbide. The spheroidal powder granules evidently served as nuclei for the crystallization of this material and hence an exceedingly compact continuous carbide phase was formed. Similar structures have been observed with other binder compositions. It will be apparent that such a structure has advantages over structures containing relatively large binder areas in which only a limited amount of hard metal is present.

EXAMPLE IX

The structures of composite materials produced in accordance with the invention are also effected by the time and temperature conditions during infiltration. This is illustrated by FIGURE 6 of the drawing. FIGURE 6 is a reduction of a photomicrograph, again at 400 power magnification, made of a specimen prepared by infiltrating spheroidal tungsten carbide powder with a cast iron binder containing 3% carbon for 4 minutes at a temperature of 2400° F. At temperatures of about 2250° F. for 4 minutes, the use of this particular binder with spheroidal tungsten carbide powder results in a composite material which exhibits a structure similar to that shown in FIGURE 2 of the drawing. At the higher temperature, however, the individual spheroidal carbide granules are altered by the binder to a point where they are scarcely visible under the microscope. As can be seen from FIGURE 6, a multitude of very fine carbide crystals have been precipitated throughout the material to produce a structure very similar to that of sintered tungsten carbide. This material is more uniform than those produced at lower temperatures and has advantages over others in applications where erosion and abrasion are apt to be particularly severe.

EXAMPLE X

A further test was carried out to demonstrate the bonding of borides with binders of the type described earlier. The test showed that a binder containing about 55% nickel, about 35% copper and about 10% tin gives a good bond with titanium diboride, $TiB_2$. This latter material can be produced in the form of spheroidal hard metal granules as described previously and infiltrated with this and other binders to produce composite materials which have pronounced advantages over materials available in the past. Other hard metals can be used in similar manner.

What is claimed is:

1. A process for the preparation of a composite material which comprises preparing a mass of discrete spheroidal refractory hard metal granules produced by melting a refractory hard metal in a high temperature gas stream and solidifying the resultant entrained spheroidal droplets, infiltrating said mass with a molten metallic binder having a melting point between about 1500° F. and about 3000° F. and the ability to wet said spheroidal granules, and solidifying said binder within said mass.

2. A process as defined by claim 1 wherein said refractory hard metal granules are spheroidal hard metal carbide granules.

3. A process as defined by claim 1 wherein said metallic binder contains constitutents from Group VIII, Series 4 of the Periodic Table in a concentration of at least 50 percent by weight.

4. A process for the manufacture of a hard, abrasion-resistant composite material which comprises preparing a mass of discrete spheroidal hard metal carbide granules produced by melting hard metal carbide powder in a high temperature plasma and solidifying the resultant entrained droplets, infiltrating said mass with a molten metallic binder having a melting point in the range between about 1500° F. and about 3000° F., and allowing said binder to solidify within said mass, said molten metallic binder having the ability to wet said hard metal carbide granules.

5. A process as defined by claim 4 wherein said hard metal carbide granules comprise tungsten carbide.

6. A process as defined by claim 4 wherein said metallic binder contains at least 50% nickel.

7. A process for the manufacture of a composite material which comprises preparing a mass of discrete spheroidal refractory hard metal granules of two distinct sizes produced by melting refractory hard metal powder in a high temperature plasma and solidifying the resultant entrained droplets, granules of one size occupying voids between granules of the other size, infiltrating said mass with a molten metallic binder having a melting point between about 2000° F. and about 2800° F. and the ability to wet said granules, and allowing said binder to solidify within said mass.

8. A process as defined by claim 7 wherein granules of one size have an average diameter between 5 and 10 times the average diameter of granules of the other size.

9. A process for the manufacture of a hard, abrasion-resistant composite material which comprises preparing a mass of discrete closely-packed spheroidal hard metal carbide granules produced by melting hard metal carbide powder in a high temperature plasma and solidifying the resultant entrained droplets, infiltrating said mass at an infiltration temperature between about 1750° F. and about 3000° F. with a molten metallic binder having the ability to wet said granules, said metallic binder containing constituents from Group VIII, Series 4 of the Periodic Table in a concentration of at least 50%, and thereafter solidifying said binder within said mass.

10. A process as defined by claim 9 wherein said hard metal carbide granules comprise tungsten carbide.

11. A process as defined by claim 9 wherein said metallic binder comprises cobalt.

12. A process as defined by claim 9 wherein said hard metal carbide granules range between about 100 mesh and about 400 mesh in size.

13. A process as defined by claim 9 wherein a hard metal carbide is dissolved in said metallic binder prior to infiltrating said mass with said binder.

14. A process as defined by claim 9 wherein said metallic binder is an iron alloy.

15. A process for the manufacture of a hard abrasion-resistant composite material which comprises placing in a refractory mold discrete spheroidal tungsten carbide granules produced by melting tungsten carbide powder in a high temperature plasma and solidifying the resultant droplets, infiltrating said discrete granules at an infiltration temperature between about 1750° F. and about 3000° F. with a molten metallic binder having a melting point between about 1500° F. and about 3000° F. and the ability to wet said granules, and thereafter cooling said mold to solidify said binder in contact with said granules.

16. A method for preparing a composite material having a hard metal carbide skeletal structure containing pores filled with a softer, more ductile material which comprises preparing a mass of discrete, closely spaced, spheroidal tungsten carbide powder granules produced by passing tungsten carbide powder through a high temperature plasma to form spheroidal droplets and cooling the resultant entrained spheroidal droplets to a temperature below the melting point of tungsten carbide, infiltrating said mass with a molten metallic binder having a melting point between about 2000° F. and about 2800° F., said binder containing constituents from Group VIII, Series 4, of the Periodic Table in a concentration of at least 50 percent by weight, and solidifying said binder in contact with said powder granules.

17. A process as defined by claim 16 wherein a refractory hard metal is dissolved in said binder prior to infiltration.

18. A process as defined by claim 16 wherein said binder includes a transition metal from the fourth through sixth groups of the Periodic Table.

References Cited by the Examiner
UNITED STATES PATENTS

| | | | |
|---|---|---|---|
| 1,423,652 | 7/1922 | Edmondson | 22—202 X |
| 1,910,884 | 5/1933 | Comstock | 27—202 X |
| 2,113,355 | 4/1938 | McKenna | 29—182.7 |
| 2,124,020 | 7/1938 | Wirth | 22—202 |
| 2,553,714 | 5/1951 | Lucas | 29—182.7 |
| 2,743,495 | 5/1956 | Ekleiud | 22—202 |
| 2,752,666 | 7/1956 | Goetzel et al. | 29—182.7 |
| 2,828,225 | 3/1958 | Goetzel et al. | 22—202 |
| 2,828,226 | 3/1958 | Goetzel et al. | 22—202 |
| 2,971,839 | 2/1961 | Nussbaum | 29—182.7 |
| 3,028,644 | 4/1962 | Waldrop | 22—202 |

OTHER REFERENCES

Goetzel: "Treatise on Powder Metallurgy," vol. 1, pp. 86–88, published 1949.

J. SPENCER OVERHOLSER, *Primary Examiner.*

MICHAEL V. BRINDISI, MARCUS U. LYONS,
*Examiners.*